US011303800B1

(12) United States Patent
Tsai (10) Patent No.: US 11,303,800 B1
(45) Date of Patent: Apr. 12, 2022

(54) REAL-TIME DISPARITY UPSAMPLING FOR PHASE DETECTION AUTOFOCUS IN DIGITAL IMAGING SYSTEMS

(71) Applicant: SHENZHEN GOODIX TECHNOLOGY CO., LTD., Shenzhen (CN)

(72) Inventor: Ping-Sing Tsai, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/373,789

(22) Filed: Jul. 13, 2021

(51) Int. Cl.
  *H04N 5/232* (2006.01)
  *H04N 5/04* (2006.01)
  *H04N 9/04* (2006.01)
(52) U.S. Cl.
  CPC ... *H04N 5/232122* (2018.08); *H04N 9/04551* (2018.08)
(58) Field of Classification Search
  None
  See application file for complete search history.

(56) References Cited

U.S. PATENT DOCUMENTS

| 2016/0301855 | A1* | 10/2016 | Imade | G02B 7/34 |
| 2019/0050681 | A1* | 2/2019 | Tate | G06V 40/161 |
| 2020/0242788 | A1* | 7/2020 | Jacobs | G06T 7/50 |
| 2021/0279469 | A1* | 9/2021 | Holland | G06V 10/462 |
| 2021/0360179 | A1* | 11/2021 | Dangi | H04N 9/643 |
| 2021/0392313 | A1* | 12/2021 | Kimura | G06N 3/0454 |

* cited by examiner

*Primary Examiner* — Cynthia Segura
(74) *Attorney, Agent, or Firm* — Kilpatrick Townsend & Stockton LLP (57) ABSTRACT

Techniques are described for real-time disparity upsampling for phase detection autofocus (PDAF) in digital imaging systems. For example, an imaging sensor array includes a number of physical PDAF sensors that provide a PDAF resolution that is a small percentage of the resolution of the imaging sensor itself. The PDAF resolution is upsampled without relying on adding physical PDAF sensors by generating simulated PDAF sensors at upsampling locations. For each upsampling location, embodiments can compute local disparity values and local contrast values for each of multiple neighboring physical PDAF sensors. An upsampled disparity value can be computed for the upsampling location by weighting the neighboring local disparity values based at least on the neighboring local contrast values. The upsampled disparity values can yield higher-resolution information for use in PDAF operations.

20 Claims, 5 Drawing Sheets

REAL-TIME DISPARITY UPSAMPLING FOR PHASE DETECTION AUTOFOCUS IN DIGITAL IMAGING SYSTEMS

TECHNICAL FIELD

This disclosure relates to digital imaging systems, and, more particularly, to real-time disparity upsampling for phase detection autofocus in digital imaging systems, such as for smart phone cameras and/or other digital cameras.

BACKGROUND

Many electronic devices include digital imaging systems. For example, most modern smartphones include one or more digital cameras. Almost all modern digital cameras (and many other digital imaging systems) include autofocus features implemented according to various different autofocus approaches. Two common approaches are referred to as contrast detection autofocus (CDAF) and phase detection autofocus (PDAF). CDAF is based on the principle that higher contrast generally correlates with better focus. As such, CDAF approaches typically involve an iterative process of measuring contrast, adjusting focal settings, and measuring contrast again, until an optimal focal setting is found (e.g., at which a highest contrast image is formed). CDAF tends to produce very sharp focus, but the iterative approach can tend to be too slow to work well in applications, such as tracking of moving objects, focus during video capture, etc.

PDAF tends to produce an appreciably faster autofocus solution than does CDAF. PDAF is based on the principle that even a slight shift in the viewpoint from which an image is captured tends to shift the relative positions of each point by an amount and distance (i.e., a disparity) corresponding to the point's distance from the focal distance of the imaging system. For example, a point that is "in focus" may not have any disparity, a closer points may manifest a positive (or negative) disparity, and farther points may manifest a negative (or positive) disparity. As such, PDAF approaches typically use PDAF sensors which are also known as pixels form an imaging sensor array, to capture a same image concurrently from slightly different viewpoints, and data from the different viewpoints is used to compute disparity measurements. The imaging system can quickly adjust focus to an optimal focal setting based on the amount and direction of the disparity measurements.

Conventionally, the effectiveness of PDAF approaches can relate to the number of PDAF sensors being used to obtain data for different viewpoints. For example, a larger number of PDAF sensors can provide higher data resolution for the different viewpoints, which can tend to provide the PDAF system with more information with which to perform more accurate autofocusing. However, increasing the number of sensors can also yield increased hardware costs, increased processing times, decreased imaging resolution, decreased low-light focusing effectiveness, and/or other undesirable consequences.

SUMMARY

Embodiments provide systems and methods for real-time disparity upsampling for phase detection autofocus (PDAF) in digital imaging systems. For example, an imaging sensor array includes a number of physical PDAF sensors that provide a PDAF resolution that is a small percentage of the resolution of the imaging sensor itself. The PDAF resolution is upsampled without relying on adding physical PDAF sensors by generating simulated PDAF sensors at upsampling locations. For each upsampling location, embodiments can compute local disparity values and local contrast values for each of multiple neighboring physical PDAF sensors. An upsampled disparity value can be computed for the upsampling location by weighting the neighboring local disparity values based on the neighboring local contrast values (e.g., and additional information, such as relative distances between the upsampling location and the neighboring physical PDAF sensor locations). The upsampled disparity values for the upsampling locations can be combined with the local disparity values for physical PDAF sensor locations to generate an upsampled disparity image to support PDAF. Some embodiments use the upsampled disparity values to generate simulated pixel image values that would have been obtained by additional physical PDAF sensors located in the upsampling locations.

According to one set of embodiments, a method is provided for real-time upsampling in a phase-detection autofocus (PDAF) system. The method includes: obtaining a phase-detection (PD) disparity map indicating a local disparity value for each of a plurality of physical PD pixels (pPDPs) of an image sensor, each local disparity value computed from original image data obtained by the image sensor, the image sensor comprising an array of pixel blocks, each pixel block being a respective photodetector array, wherein a subset of the pixel blocks is configured as PD blocks by, for each of the subset of the pixel blocks, configuring a portion of the respective photodetector array to form at least one of the plurality of pPDPs, such that each of the plurality of pPDPs is associated with one of a plurality of pPDP locations in the PD blocks; computing a local contrast value for each of the plurality of pPDP locations based on spatial contrast information generated from the original image data; identifying a plurality of upsampled PD pixel (uPDP) locations, each as a location within the respective photodetector array of a respective one of the pixel blocks other than the PD blocks; and for each uPDP location of at least some of the plurality of uPDP locations: identifying at least first and second of the plurality of pPDP locations as proximate to the uPDP location; computing a set of upsampling weights based at least on the local contrast value for each of at least the first pPDP location and the second pPDP location; and computing an upsampled disparity value for the uPDP location based on the set of upsampling weights and on the local disparity values indicated by the PD disparity map for those of the plurality of pPDPs associated with at least the first pPDP location and the second pPDP location.

According to another set of embodiments, a phase-detection autofocus (PDAF) resolution upsampling system is provided. The system includes: a disparity map interface to couple with a pixel-to-disparity converter to obtain a phase-detection (PD) disparity map indicating a local disparity value for each of a plurality of physical PD pixels (pPDPs) of an image sensor, each local disparity value computed from original image data obtained by the image sensor, the image sensor comprising an array of pixel blocks, each pixel block being a respective photodetector array, wherein a subset of the pixel blocks is configured as PD blocks by, for each of the subset of the pixel blocks, configuring a portion of the respective photodetector array to form at least one of the plurality of pPDPs, such that each of the plurality of pPDPs is associated with one of a plurality of pPDP locations in the PD blocks; a contrast map interface to couple with a contrast mapper to obtain a local contrast value for each of the plurality of pPDP locations based on spatial contrast information generated from the original image data; and a disparity upsampler coupled with the disparity map interface and the contrast map interface, and comprising: a weights generator to compute, for each upsampled PD pixel (uPDP) location of a plurality of uPDP locations that each correspond to a physical location within the respective photodetector array of a respective one of the non-PD blocks, a set of upsampling weights based at least on the local contrast value for each of at least a first pPDP location and a second pPDP location determined to be proximate to the uPDP location; and an upsampling filter to compute, for each uPDP location, an upsampled disparity value for the uPDP location based on the set of upsampling weights computed for the uPDP location and based on the local disparity values indicated by the PD disparity map for those of the plurality of pPDPs associated with at least the first pPDP location and the second pPDP location.

According to another set of embodiments, a system is provided for real-time upsampling in a phase-detection autofocus (PDAF) system. The system includes: one or more processors; and a non-transient, processor-readable memory having instructions stored thereon which, when executed, cause the one or more processors to perform steps. The steps include: obtaining a phase-detection (PD) disparity map indicating a local disparity value for each of a plurality of physical PD pixels (pPDPs) of an image sensor, each local disparity value computed from original image data obtained by the image sensor, the image sensor comprising an array of pixel blocks, each pixel block being a respective photodetector array, wherein a subset of the pixel blocks is configured as PD blocks by, for each of the subset of the pixel blocks, configuring a portion of the respective photodetector array to form at least one of the plurality of pPDPs, such that each of the plurality of pPDPs is associated with one of a plurality of pPDP locations in the PD blocks; computing a local contrast value for each of the plurality of pPDP locations based on spatial contrast information generated from the original image data; identifying a plurality of upsampled PD pixel (uPDP) locations, each as a location within the respective photodetector array of a respective one of the pixel blocks other than the PD blocks; and for each uPDP location of at least some of the plurality of uPDP locations: identifying at least first and second of the plurality of pPDP locations as proximate to the uPDP location; computing a set of upsampling weights based at least on the local contrast value for each of at least the first pPDP location and the second pPDP location; and computing an upsampled disparity value for the uPDP location based on the set of upsampling weights and on the local disparity values indicated by the PD disparity map for those of the plurality of pPDPs associated with at least the first pPDP location and the second pPDP location.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Figure 1:
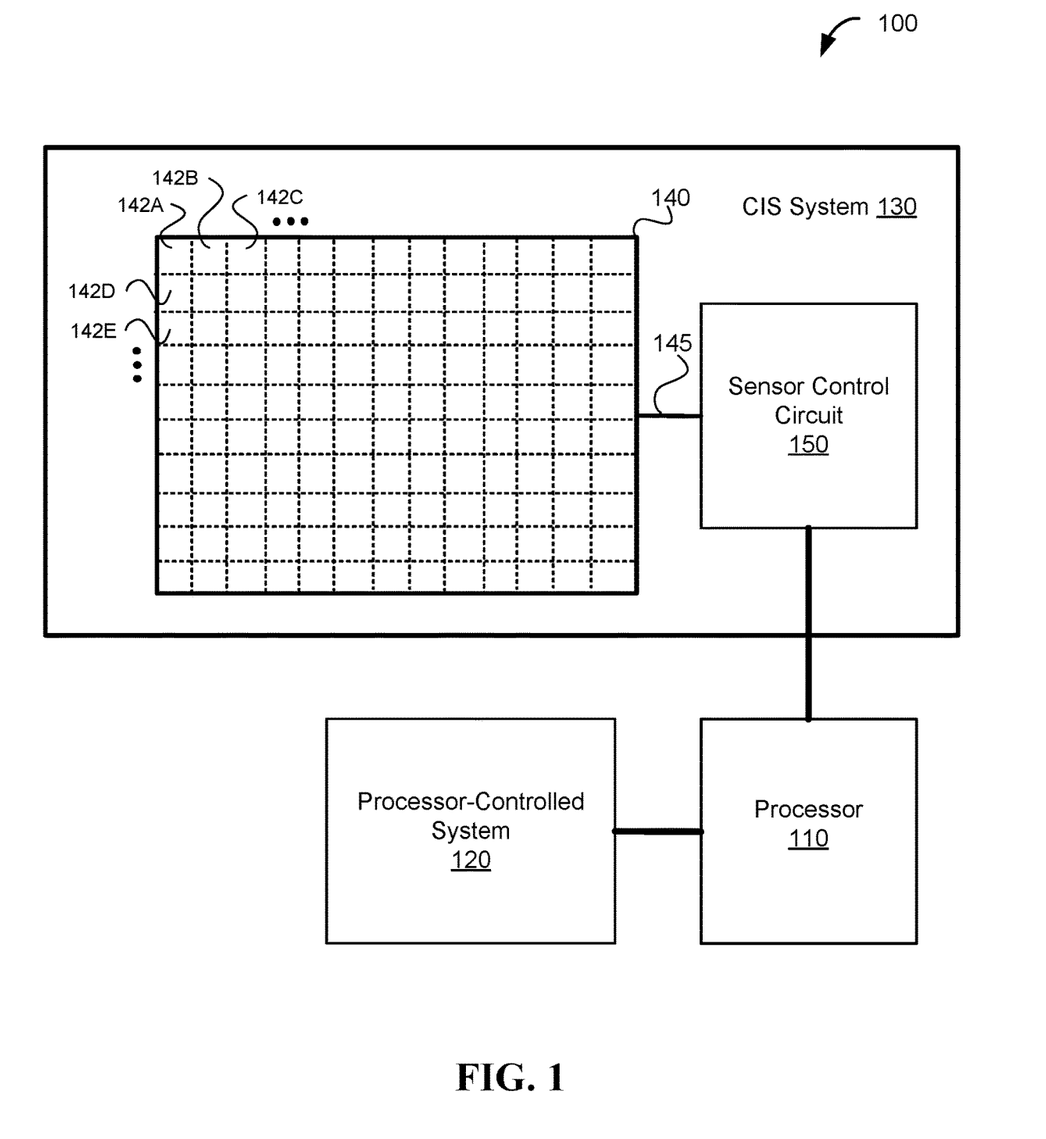
FIG. 1, a block diagram is shown of an imaging sensor environment as context for various embodiments described herein.

Turning to FIG. 1, a block diagram is shown of an imaging sensor environment 100 as context for various embodiments described herein. The imaging sensor environment 100 is illustrated as including a processor 110 in communication with a processor-controlled system 120 and a complementary metal-oxide semiconductor (CMOS) imaging sensor (CIS) system 130. The imaging sensor environment 100 may be used to implement a digital imaging system in any suitable application context. For example, the processor 110, processor-controlled system 120, and CIS system 130 can all be implemented in a smartphone, digital camera, wearable device, implantable device, laptop computer, tablet computer, electronic reader, Internet of things (IoT) appliance, or any other suitable context.

The processor-controlled system 120 is intended generally to represent any suitable system or systems to provide any suitable features of the imaging sensor environment 100, other than those of the CIS system 130. For example, in a smart phone, the processor-controlled system 120 can include subsystems for providing telephonic and communications features, display features, user interaction features, application processing features, etc. Embodiments of the imaging sensor environment 100 can include one or more processors 110. In some embodiments, the one or more processors 110 are shared between the processor-controlled system 120 and the CIS system 130. In other embodiments, one or more processors 110 are used by the processor-controlled system 120, and the CIS system 130 has its own one or more dedicated processors 110.

Embodiments of the CIS system 130 include a sensor array 140 and a sensor control circuit 150. As described below, the sensor array 140 and sensor control circuit 150 can communicate via an interface channel 145. The sensor array 140 can be implemented as an array of photodetector elements 142, which can be implemented by any suitable photosensitive component or group of components. In some implementations, each photodetector element 142 can include a photodiode that is configured to detect light energy in one or more frequency bands. For example, the photodetector elements 142 implement a color filter array, such that the sensor array 140 can detect light energy in at least the range of colors of the visible spectrum and can output corresponding electrical signals. As described herein, a portion of the photodetector elements 142 are implemented as phase-detection pixels to facilitate phase-detection autofocus (PDAF) features, including those described herein.

The sensor control circuit 150 can include any suitable processors and/or circuits for directing operation of the sensor array 140, processing signals received from the sensor array 140, and interfacing with other systems (e.g., processor 110). Some implementations of the sensor control circuit 150 are implemented as, or include a companion integrated circuit (IC) having integrated interface components, storage components, and processing components. For example, the processing components of the sensor control circuit 150 can include one or more central processing units (CPUs), application-specific integrated circuits (ASICs), application-specific instruction-set processors (ASIPs), graphics processing units (GPUs), physics processing units (PPUs), digital signal processors (DSPs), field-programmable gate array (FPGAs), programmable logic devices (PLDs), controllers, microcontroller units, reduced instruction set computer (RISC) processors, complex instruction set computer (CISC) processors, microprocessors, or the like, or any combination thereof.

As described herein, the CIS system 130 is configured to provide novel autofocus features. Autofocus features are ubiquitous in digital imaging systems, and many such autofocus features are implemented according to either a contrast detection autofocus (CDAF) approach or a phase detection autofocus (PDAF) approach. CDAF is based on the principle that higher contrast generally correlates with better focus (e.g., blurry edges in an image can manifest as lower overall contrast in the image). As such, CDAF approaches typically involve an iterative process of measuring contrast, adjusting focal settings, and measuring contrast again, until an optimal focal setting is found (e.g., at which a highest contrast image is formed). For example, an imaging data is obtained by the sensor array 140, and the imaging data can be down-sampled and high-pass filtered to obtain a contrast image indicating contrast levels across the image. The CDAF approach can analyze the contrast image by performing global and local searches of pixels to effectively determine how blurry the image appears to be. In each of a number of subsequent iterations, focal settings can be adjusted, an updated contrast image can be obtained, and the updated contrast image can be reanalyzed to determine whether the image appears to be getting more or less blurry.

While CDAF can produce very sharp focus, it typically has various limitations. One limitation is that the contrast information of any individual iteration does not indicate how out of focus an image is, or in which direction (i.e., which direction of focal adjustment will improve the focus). As such, CDAF may initially adjust focal settings in the wrong direction, initially making the focus worse, before detecting the error and reversing course; and finding a correct focal setting make take many iterations, each time making small setting changes. Further, the contrast information in any particular iteration may not indicate whether an optimal focal setting has been reached. As such, CDAF typically continues to adjust focus until it reaches then passes an optimal focal point, at which point CDAF can determine that the focus is again worsening and can respond by backtracking to the optimal focal setting. For at least these reasons, CDAF can tend to be too slow to work well in many applications, such as tracking of moving objects, focus during video capture, etc. For example, CDAF may consume around 30 frames to settle on optimal focal settings; by that time, many moving objects will have changes position and will again be out of focus. Even with still image capture, users can be frustrated by the picture-taking lag caused by CDAF.

PDAF is based on an entirely different principle than CDAF, and tends to reach an optimal focal setting appreciably faster than CDAF. In general, PDAF works in a way that is similar to human depth perception. Because human eyes are horizontally separated, each eye sees a slightly different image (i.e., each eye is seeing the same scene from a slightly different viewpoint). In particular, when the eyes are both focused on a particular point in space, that point is effectively in the same place in both the left-eye and the right-eye images. However, any points that are closer to, or farther from the eyes will tend to be spatially shifted in one eye's images relative to the other eye's image. The amount and direction of shift mathematically (e.g., geometrically) correlates to the separation between the eyes and the distance of the object from the eyes (e.g., or from the focal distance). The amount and direction of spatial (phase) shift between the two viewpoints is referred to as "disparity."

PDAF exploits this principle by configuring PDAF sensors to capture a same image concurrently from slightly different viewpoints, and to use the data from the different viewpoints to compute disparity measurements. For example, masking and/or lenses are used to configure some sensors for detecting a first viewpoint, and to configure other sensors for concurrently detecting a second viewpoint. Typically, the different viewpoints are configured to be complementary, such as right and left, up and down, etc. Rather than iteratively trying different settings to figure out an optimal amount and direction of focal adjustment as in CDAF, the disparity measurements computed in the PDAF approach directly indicate the amount and direction of focal adjustment to apply for optimal focus.

Figure 2:
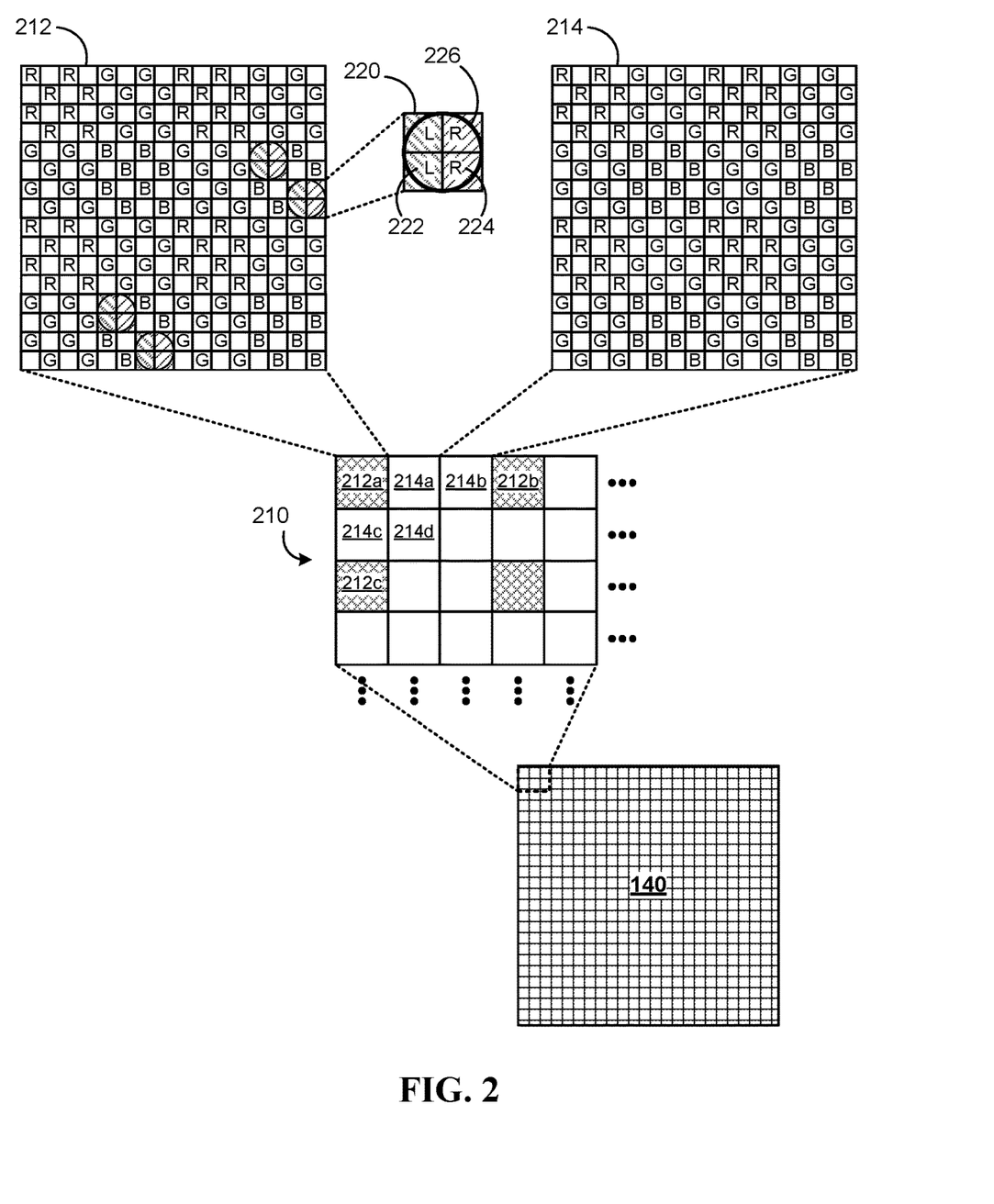
FIG. 2 shows more detailed views of an example implementation of the imaging sensor array configured for phase-detection autofocus (PDAF) features.

FIG. 2 shows more detailed views of an example implementation of the imaging sensor array 140 configured for PDAF features. As described above, the imaging sensor array 140 includes an array of photodetector elements 142, such as photodiodes. Embodiments of the imaging sensor array 140 arrange the photodetector elements 142 into an array of pixel blocks 210, such that each pixel block 210 is an instance of a N×M photodiode array, where N and M are positive integers. In some implementations, N can be equal to M, such that each pixel block is a square photodiode array. In some implementations, each pixel block 210 has the same number of photodetector elements 142. In some implementations, each pixel block 210 can be generally arranged according to a same color filter array (CFA) pattern (e.g., Bayer pattern, etc.).

As descried above, a portion of the pixels of the imaging sensor array 140 are configured to form PDAF sensors (referred to herein as physical phase-detection (PD) pixels, or pPDPs 220). As illustrated, a subset of the pixel blocks 210 are PD blocks 212, indicating that each PD block 212 includes at least one pPDP 220. Others of the pixel blocks 210 that are not PD blocks 212 are indicated as non-PD blocks 214. In the illustrated configuration, one-sixth of the pixel blocks 210 are PD blocks 212, and the remaining five-sixths of the pixel blocks 210 are non-PD blocks 214. As illustrated, each non-PD block 214 is arranged according to so-called "HexD-W" blocks, such that each is a 16-by-16 photodetector array (i.e., 256 pixels) following a "RGGBW" CFA pattern (red, green, green, blue, white).

Each PD block 212 can be arranged in substantially the same way as the non-PD blocks 214, except that some of the photodetector elements 142 of each PD block 212 are configured to form pPDPs 220. As illustrated, each PD block 212 is implemented as a HexD-W block with 16 of its photodetector elements 142 configured to form four pPDPs 220. In some implementations, each pPDP 220 is formed by implementing an on-chip lens (OCL) 226 on top of a square grouping of photodetector elements 142. The OCL 226 is configured to form multiple viewpoints from the perspective of the pPDP 220. In the illustrated configuration, each pPDP 220 includes a 2×2 OCL 226 disposed on a 2×2 grouping of photodetector elements 142, thereby effectively forming a 2×1 left-viewpoint elements 222 and 2×1 right-viewpoint elements 224.

The above description follows a convention of referring to a single pPDP 220 as a 2×2 grouping of photodetector elements 142 with a 2×2 OCL 226 disposed thereon. Other embodiments can implement pPDPs 220 in other ways, and/or reference to pPDPs 220 can follow other conventions. For example, each photodetector element 142 used for PD sensing can be referred to independently as a pPDP 220, such that the illustrated implementation can be considered as groupings of four pPDPs 220 having a 2×2 OCL 226 disposed thereon. In other implementations, 2×1 OCLs 226 are disposed above a groupings of two photodetector elements 142, and each grouping of two photodetector elements 142 with its 2×1 OCL 226 is referred to as a pPDP 220. In other implementations, pPDPs 220 are formed by using metal shielding (or any suitable opaque substance) to block certain photodetector elements 142, or portions of photodetector elements 142. Techniques described herein can generally operate without relying on, or requiring any particular type of pPDP 220 implementation, any particular imaging sensor array 140 dimensions, etc.

As described above, PDAF approaches involve computing disparity measurements using data from the PDAF sensors (i.e., from the pPDPs 220). Computing the disparity measurements involves complex computations, including accurate pattern identification and matching between the different viewpoints. Conventionally, the effectiveness of PDAF approaches can relate to the number of PDAF sensors being used to obtain data for different viewpoints. A larger number of PDAF sensors can provide higher data resolution for pattern matching and disparity computations in the different viewpoints, which can tend to provide the PDAF system with more information with which to perform more accurate autofocusing. For example, some conventional PDAF approaches configure around 5-10 percent of the imaging sensor array 140 pixels as pPDPs 220, and other conventional approaches have configured up to 100 percent of the imaging sensor array 140 pixels as pPDPs 220. While such large numbers of pPDPs 220 provide certain features, increasing the number of pPDPs 220 can also yield increased hardware costs, increased processing times, decreased imaging resolution, decreased low-light focusing effectiveness, and/or other undesirable consequences. For example, using large numbers of OCLs to form large numbers of pPDPs 220 can be relatively expensive and complex to manufacture; alternatively, using large amounts of metal shielding to form large numbers of pPDPs 220 can reduce the amount of light reaching the photodetector elements 142 and can reduce imaging quality.

Some implementations can include additional limitations on the practical number of pPDPs 220 that can be included in the imaging sensor array 140. Referring back to FIG. 1, the illustrated imaging sensor environment 100 shows the sensor control circuit 150 in communication with the imaging sensor array 140 via an interface channel 145, and the maximum number of conventional pPDPs 220 that can be implemented in the sensor array 140 may be limited by the speed and/or bandwidth of the interface channel 145. In one example implementation, the imaging sensor array 140 has tens of millions of photodetector elements 142 (e.g., a 42 Megapixel sensor array), and the imaging sensor array 140 communicates with the companion IC of the sensor control circuit 150 via a relatively low-bandwidth interface channel 145 (e.g., mobile industry processor interface, or MIPI®). In such an implementation, each additional percent of the pixels that is implemented as pPDPs 220 can result in hundreds of thousands of additional pPDPs 220 outputs being communicated over the interface channel 145.

For these and other reasons, embodiments described herein are assumed to have a relatively low percentage of pPDPs 220. For example, in the illustrated implementation of FIG. 2, only one-sixth of the pixel blocks 210 of the imaging sensor array 140 are PD blocks 212, and each PD block 212 of FIG. 2 uses only 16 of its 256 photodetector elements 142 to form pPDPs 220. Thus, in the illustrated implementation, only around one percent of the photodetector elements 142 is being used to form pPDPs 220. As noted above, while implementing such a relatively small percentage of pPDPs 220 can be desirable in terms of cost, manufacturability, data communications, etc.; the relatively small percentage of pPDPs 220 also provides relatively low-resolution data for use in performing PDAF.

Figure 3:
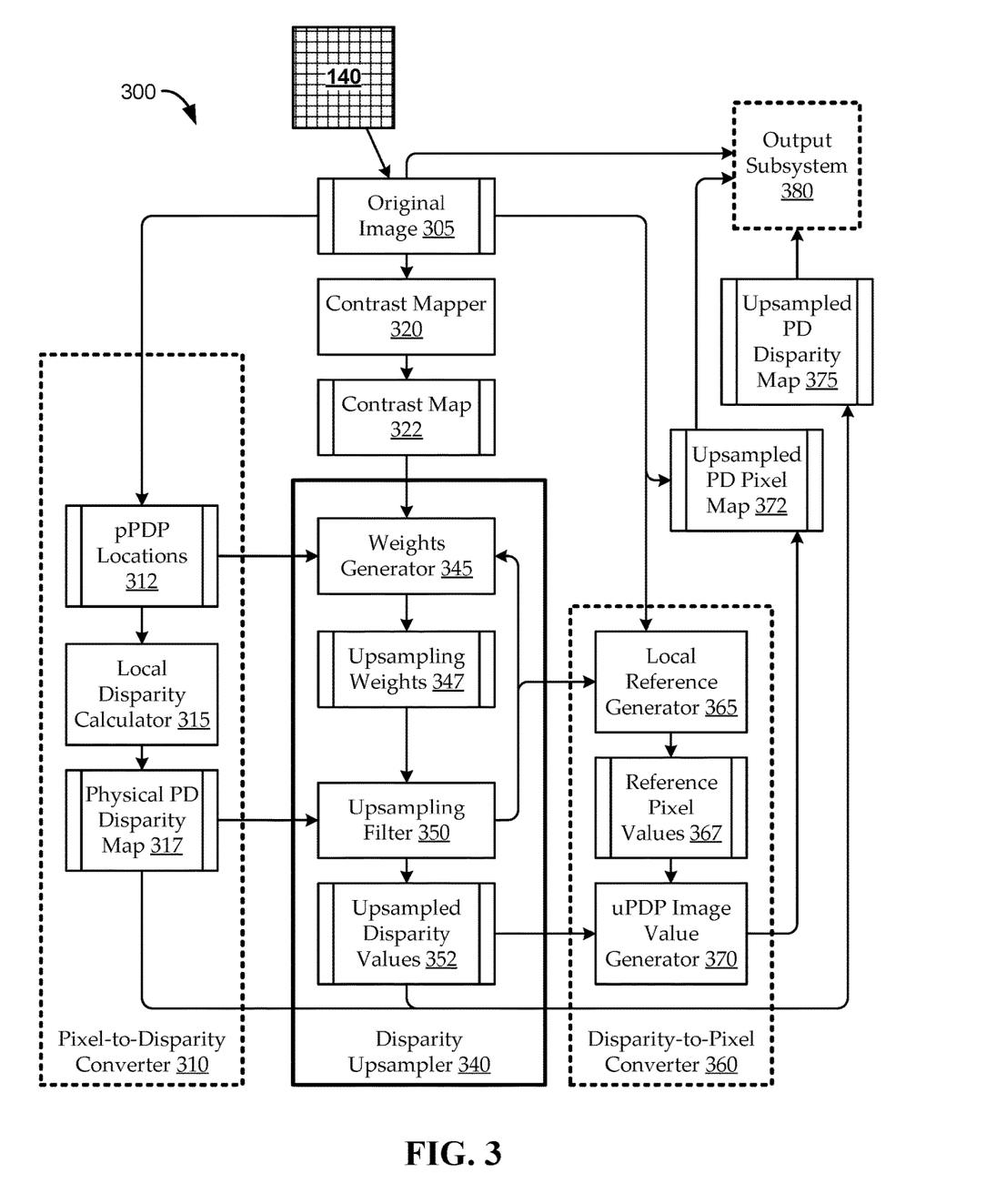
FIG. 3 shows a block diagram of an illustrative PDAF resolution upsampling system, according to various embodiments described herein.

As described herein, embodiments provide novel PDAF approaches that effectively increase PDAF data resolution without increasing the number of pPDPs 220. FIG. 3 shows a block diagram of an illustrative PDAF resolution upsampling system 300, according to various embodiments described herein. The PDAF resolution upsampling system 300 is configured for real-time, contrast-weighted disparity upsampling to effectively increase the amount of useful phase-detection (PD) information available for performing PDAF. Embodiments of the PDAF resolution upsampling system 300 can be implemented using one or more processors. For example, the PDAF resolution upsampling system 300 can be implemented in a companion IC coupled with an imaging sensor array 140, such as by the sensor control circuit 150 of the CIS system 130 of FIG. 1. In such implementations, the PDAF resolution upsampling system 300 includes one or more memories (not explicitly shown) that include instructions stored thereon which, when executed, cause the one or more processors to perform various function described herein. For example, such instructions can be implemented in firmware, state machines, and/or any other suitable manner.

As illustrated, the PDAF resolution upsampling system 300 includes at least a disparity upsampler 340. In some embodiments, the PDAF resolution upsampling system 300 further includes a pixel-to-disparity converter 310, a contrast mapper 320, a disparity-to-pixel converter 360, and/or an output subsystem 380. For context the imaging sensor array 140 is shown outputting original image data 305. The original image data 305 can include pixel image values corresponding to detection outputs of all the photodiodes in the imaging sensor array 140. For example, in embodiments where each pPDP 220 is implemented using a 2-by-2 block of (i.e., four) photodetectors, the original image data 305 can include four corresponding pixel image values. In some implementations, the original image data 305 includes individual data for each photodetector in the imaging sensor array 140. In other implementations, the sensor output from the imaging sensor array 140 is reduced by pixel binning, or some other down-sampling type of operation. For example, based on the CFA pattern used to implement the imaging sensor array 140, same-colored pixels can be binned together prior to being output as part of the original image data 305. Similarly, pixel image values from multiple photodetectors can be combined and/or reconfigured to generate an output that complies with a particular standard, such as by converting to a standard RGB output for delivery over a MIPI interface.

Embodiments of the pixel-to-disparity converter 310 can use the original image data 305 to generate a map of disparity values for the pPDPs 220 of the imaging sensor array 140. As illustrated, embodiments of the pixel-to-disparity converter 310 can include a local disparity calculator 315. The local disparity calculator 315 can receive and/or obtain a map (e.g., list) of pPDP locations 312, and can compute disparity for each pPDP 220 in each of the pPDP locations 312 based on computing a phase shift (e.g., a spatial shift) between different viewpoints detected by the pPDP 220 in that pPDP locations 312. Each pPDP 220 uses an OCL or other optical component(s) to effectively receive multiple viewpoints at its component photodetectors. For example, as described with reference to FIG. 2, each pPDP 220 can include one or more left-viewpoint elements 222 and one or more right-viewpoint elements 224. In some implementations, the photodetectors contributing to a same viewpoint can be binned together. For example, each pPDP 220 can output a single pixel image value for each viewpoint (e.g., a single left-viewpoint pixel image value and a single right-viewpoint pixel image value). The multiple-viewpoint pixel image values can be used to compute an amount of spatial shift between the viewpoints. For example, all the left-viewpoint pixel image values from across all the pPDPs 220 of the imaging sensor array 140 can be used to generate a left-viewpoint image, and all the right-viewpoint pixel image values from across all the pPDPs 220 of the imaging sensor array 140 can be used to generate a right-viewpoint image. Pattern and/or template matching, and/or other image processing is performed between the left-viewpoint and right-viewpoint images to find common features for use in determining amounts and directions of local spatial shift (i.e., amount of disparity).

In some embodiments, the local disparity calculator 315 can be configured with particular settings (e.g., template size, search range, etc.), and can use a Sum-of-Absolute-Difference (SAD) operation to obtain disparity values at each pPDP location 312. Some embodiments further perform a confidence level check. For example, a quality check can be performed on the calculated SAD curve to ensure a valid disparity output. In some implementations, various conditions are evaluated to determine whether the SAD curve passes the confidence level check, such as: determining that a SAD vector length corresponding to the SAD curve computation is at least a minimum length (e.g., implying a minimum search range); determining that the SAD curve has a local minimum (e.g., and only one single local minimum); determining that the local minimum of the SAD curve is in or near the middle of the SAD curve (e.g., the local minimum is not one of the first two or last two SAD values); determining that the SAD value difference between the local minimum and its nearest neighbor is larger than a predetermined (e.g., configurable) threshold; etc. Some implementations perform sub-pixel interpolation by deriving disparity in sub-pixel precision using a curve fitting technique applied to the computed SAD curve. For example, the curve fitting can identify a SAD global minimum point at subpixel precision. In some implementations, the confidence level check is used to determine whether to disregard (i.e., not use) certain disparity values for upsampling (e.g., and/or for other PDAF functions). For example, for any pPDP location 312 that fails the confidence level check, some implementations can ignore the disparity in that location, and other implementations can set the disparity in that location to zero.

The local disparity calculator 315 can compute a single disparity value for each pPDP 220 (e.g., at each pPDP location 312), which it can output as a physical PD disparity map 317. For example, an imaging sensor array 140 with a resolution of X (e.g., 48 million) pixels is configured with Y (e.g., one) percent of its photodetectors being used to form pPDPs 220, and each pPDP 220 is formed using a block of Z (e.g., four) photodetectors; the local disparity calculator 315 can compute up to $X*Y/Z$ (e.g., approximately one quarter of one percent of the full resolution of the imaging sensor array 140, or 124,500 disparity values associated with 124,500 pPDP locations 312). The physical PD disparity map 317 can effectively be an array of values, such that each location in the array corresponds to one of the pPDP locations 312, and the array value assigned to each array location is the computed disparity for the pPDP 220 at the corresponding pPDP location 312.

Some embodiments of the local disparity calculator 315 can include additional features to support computation of pixel-wise disparity. For example, the local disparity calculator 315 can include a binning module to transform each pPDP 220 into a single value for each viewpoint (e.g., a 2-by-2 pPDP 220 originally having four values can be converted into 1-by-2 block representing a first-viewpoint value and a second-viewpoint value). Some embodiments of the local disparity calculator 315 can include a sensitivity correction module. For example, due to optical system manufacturing tolerances, sensitivity differences between pixels used for imaging and for pPDPs 220, the sensitivity correction module can implement gain compensation to ensure that the different pixels have similar sensitivities. Such a sensitivity correction module can be used to reduce or eliminate optical system (e.g., imaging lens and micro lens) manufacturing tolerance concerns, and/or to normalize pPDP 220 levels to other optical imaging pixel levels. Such sensitivity correction can be useful for performing disparity-to-pixel conversion by the disparity-to-pixel converter 360, as described below. In some implementations, the sensitivity correction module multiplies each viewpoint element (e.g., each left-viewpoint or right-viewpoint element of a pPDP 220) by a separate gain, which is pre-calibrated into a locally stored knot table and extend by means of bilinear interpolation.

Some embodiments of the local disparity calculator 315 can include a low-pass filtering module to perform de-noising operations across the pPDPs 220, such as performing a simple horizontal de-noise for a pPDP 220 configured to provide horizontal disparity. For example, a one-dimension filter can be configured by a register in terms of filter length and weights to perform the simple de-noising. In such embodiments, the disparity values in the physical PD disparity map 317 can be sensitivity-corrected values.

Some embodiments of the local disparity calculator 315 include a contrast detection module to detect a pixel-wise contrast. For example, local-window pixel information can be utilized to obtain average and deviation statistics relating to contrast, and to output a binary decision, such as for use as a flag for adaptive selection of which pPDPs 220 to use for upsampling. Focusing operations described herein use both contrast information and phase information. As such, simple detection of scene contrast by the contrast detection module can improve the robustness of local disparity calculations. In some implementations, local-window pixel information is determined by a selected search range, and multiple-viewpoint (e.g., left and right) information is summed together. Average and deviation statistics based on current local information can be computed, and a decision boundary can be set for decision making. Some implementations can be gain-based. For example, in low-gain applications (e.g., where there is high illumination), local-pixel variations tend to arise primarily from scene content information; while in high-gain applications (e.g., where there is low illumination), local-pixel variations tend to arise primarily from noise, and not image content. Thus, the contrast detection module ca be configured to operate differently under high-gain and low-gain applications.

Embodiments of the disparity upsampler 340 include a weights generator 345 and an upsampling filter 350. The upsampling filter 350 is configured to upsample the disparity values from the physical PD disparity map 317 using weighting based at least on local contrast values. The upsampling filter 350 can perform the upsampling in accordance with an identified set of upsampled PD pixel (uPDP) locations (also referred to herein as "upsampled locations"). In some implementations, the upsampling filter 350 identifies uPDP locations by obtaining the uPDP locations from a predefined template, or other stored information. In other implementations, the upsampling filter 350 identifies uPDP locations by computing them from pPDP locations 312 (e.g., identified in the physical PD disparity map 317). Each uPDP location corresponds to a location within the respective photodetector array of a non-PD blocks 214. In some implementations, the uPDP location is at a same relative position within its non-PD block 214 as neighboring pPDP locations are within their respective PD blocks 212. The number of uPDP locations determines the amount of upsampling. For example, in a pixel block 210 array like the one shown in FIG. 2, each group of six pixel blocks 210 includes a single PD block 212 and five non-PD blocks 214, and each PD block 212 uses one-sixteenth of its 256 photodetectors to form four pPDPs. This can be considered as a PDAF resolution of approximately one percent (i.e., 16/256*1/6≈0.01). If a single uPDP location in a non-PD block 214 is identified for each pPDP in each PD block 212, the PDAF resolution can effectively double (e.g., from approximately 1 percent to approximately 2 percent). If the pPDPs in the PD blocks 212 are used to identify the same density of uPDP locations in all of the non-PD blocks 214, the resolution can effectively be increased by up to six times (depending on the total number and configuration of pixel blocks 210, there may not be five non-PD blocks 214 for every PD block 212; such that the resolution may increase by less than six times in such a case).

Embodiments of the weights generator 345 can generate any suitable contrast-based weights for use generating upsampled disparity values for each of the uPDP locations based on the computed local disparity values indicated by the physical PD disparity map 317. Some embodiments of the weights generator 345 can obtain and/or compute a local contrast value for each of the pPDP locations 312 based on spatial contrast information generated from the original image data 305. Some implementations of the weights generator 345 compute the local contrast values from a received contrast map 322. Other implementations of the weights generator 345 receive the contrast map 322 in a manner that indicates the local contrast values without relying on further computation.

For example, some embodiments of the PDAF resolution upsampling system 300 include a contrast mapper 320 that uses the original image data 305 to generate the contrast map 322. The contrast map 322 can be generated to have a resolution that is higher than that of the physical PD disparity map 317 and is the same as, or lower than, that of the original image data 305. Some CFA patterns include interspersed white pixels, and some embodiments can generate the contrast map 322 by high-pass-filtering the white pixel outputs. For example, in the hexa-deca CFA pattern described above, the imaging sensor array 140 is a 6,000-by-8,000 array of photodetectors that alternates between an RGB pixel and a white pixel. As such, an initial high-pass-filtering operation in such an implementation can yield 3,000-by-4,000 contrast values. Some embodiments can output the entire array of contrast values as the contrast map 322. Other embodiments of the contrast mapper 320 can sub-sample the contrast values according to predefined pixel locations. Such embodiments can use the sub-sampling operation to generate contrast values at least in each of the pPDP locations 312, so that the contrast map 322 can be output with at least the same resolution (e.g., and array structure) as the physical PD disparity map 317. Some such embodiments also use the sub-sampling operation to generate contrast values for upsampled locations to be output as part of upsampled PDAF data, as described further below (e.g., the contrast map 322 can be output with at least the same resolution and/or array structure as the upsampled PD disparity map 375 described below).

Figure 4:
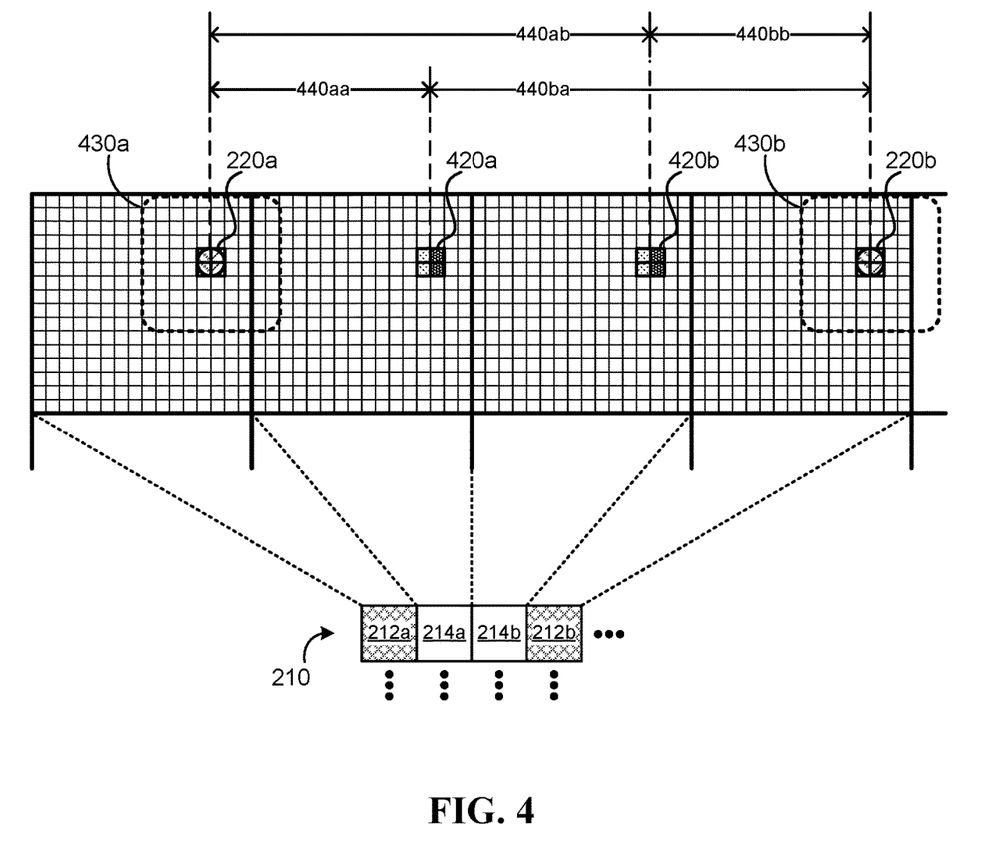
FIG. 4 shows an illustrative portion of an array of pixel blocks having two phase-detection (PD) blocks separated by two non-PD blocks.

For the sake of illustration, FIG. 4 shows an illustrative portion of an array of pixel blocks 210 having two PD blocks 212 separated by two non-PD blocks 214. Each pixel block 210 is shown in a zoomed-in, but simplified form without any of the CFA information. In each of the PD blocks 212, only a single pPDP 220 is shown (i.e., a single grouping of four photodetector elements 142 having an OCL 226 disposed thereon to effectively form two 2×1 viewpoint images). As described herein, embodiments seek to use imaging information received from the pPDPs 220 (i.e., the physical PD pixels) and their surroundings to compute upsampled PD pixels (uPDPs) 420 (i.e., simulated PD pixels in particular designated locations represented as uPDPs 420). Each uPDP 420 is associated with a location in a non-PD block 214, which can be location of a photodetector element 142, or a block of photodetector elements 142. However, the uPDPs 420 are not physically implemented. For example, there is no particular OCL, metal shield, or dedicated set of photodetector elements 142 physically making up the uPDP 420. Rather, each uPDP 420 is an upsampling of neighboring pPDPs 220; a representation of the outputs that would be generated by a pPDP 220 in the uPDP 420 location, if there were a pPDP in that location. In effect, the uPDPs 420 provide an increased resolution of PDAF data without increasing the number of physical PDAF sensors (e.g., and without related cost, complexity, data interface requirements, etc.).

Thus, the uPDPs 420 illustrated in FIG. 4 are intended to indicate an illustrative representation of the uPDP 420 in an associated illustrative uPDP location. As shown, each uPDP 420 can be associated with an upsampled location in an associated non-PD block 214 that corresponds to the physical location of a neighboring pPDP 220 in its PD block 212. For example, the location of a pPDP 220 can be identified by a location of its lowest-leftmost photodetector element 142 relative to the two-dimensional grid of photodetector elements 142 beginning at a lowest-leftmost photodetector element 142 in the PD block 212. For example, each illustrated 16-by-16 PD block 212 includes a single pPDP 220 at location (13,11). In the illustrated implementation, each uPDP 420 is similarly assigned to location (13,11) in its respective non-PD blocks 214. Consistently locating pPDPs 220 and uPDPs 420 can provide certain features, such as simplifying physical implementations, simplifying certain computations, etc. However, other embodiments can implement pPDPs 220 to be in different physical locations in different PD blocks 212, and/or compute uPDPs 420 to have upsampled locations that are different in different non-PD blocks 214, different from neighboring pPDPs 220, etc.

For the sake of comparison, a simple approach to increasing the resolution of PDAF data would be to interpolate pixel image values and/or disparity values from the pPDPs 220. For example, if the left-viewpoint elements 222 of a first pPDP 220a in a first PD block 212a outputs a value of 50 (an arbitrary value chosen purely for illustration), and the left-viewpoint elements 222 of a second pPDP 220b in a second PD block 212b outputs a value of 70 (again, an arbitrary value chosen purely for illustration), an interpolated value of 60 can be assigned to a location between pPDP 220a and pPDP 220b. While such an approach would technically generate more PDAF data points, the interpolated data points not reliably provide additional useful information for PDAF. As an extreme illustrative example, suppose the imaging system is attempting to focus on a surface with deep, regularly spaced waves, and the resolution (density, spacing, etc.) of the pPDPs 220 happens to be such that each pPDP 220 "sees" (receives light reflected from) a respective crest of the wavy surface. The pPDPs 220 may incorrectly detect a flat surface (due to their insufficient resolution), but simple interpolation would only produce a higher resolution version of the same flat surface. In effect, the information between the crests of the surface texture would be lost to the PDAF system, and the higher data density does not truly provide better PDAF resolution.

Returning to FIG. 3, the disparity upsampler 340 seeks to effectively increase PDAF data resolution without increasing the number of pPDPs 220 by leveraging both disparity values for the pPDPs 220 and local contrast data around the pPDPs 220 to generate the uPDPs 420 in real time. As described above, the physical PD disparity map 317 is a low-resolution map indicating a local disparity value for each pPDP 220. The contrast map 322 can be generated (e.g., by the contrast mapper 320) by sub-sampling contrast information local to the pPDP 220 locations. For example, referring to FIG. 4, local contrast information for each pPDP 220 can be sub-sampled from its surrounding dashed region 430 (e.g., the dashed regions 430 are intended only to generally represent a surrounding region, and the sizes and shapes of the dashed regions 430 are not intended to indicate an actual size or shape, or to be otherwise limiting).

Returning to the weights generator 345, embodiments can also obtain and/or compute distance measurements between each uPDP location and multiple neighboring ones of the pPDP locations 312. For example, in some implementations, distance measurements can be previously programmed, hardcoded, or the like based on known geometry of the imaging sensor array 140 and respective locations of pPDPs 220 in the imaging sensor array 140; such distance measurements can be retrieved from a lookup table, or in any other suitable manner. In other implementations, the distance measurements are computed by the weights generator 345 based on identifying neighboring pPDP locations 312 as proximate to each uPDP location and computing distances to those nearest neighbors. Some implementations can obtain (e.g., lookup, retrieve, compute, etc.) distance measurements for each uPDP location based on its two nearest neighbors. Other implementations can obtain distance measurements for each uPDP location based on a geometrically consistent set of two or more neighbors that may or may not be the nearest neighbors as distance measurements for that uPDP location.

For the sake of illustration, in the pixel block 210 array shown in FIG. 4, each non-PD block 214 has a first PD block 212 directly adjacent (e.g., non-PD block 214a has PD block 212a immediately to its left, and non-PD block 214b has PD block 212b immediately to its right), and a second PD block 212 one block away in the opposite direction (e.g., non-PD block 214a has PD block 212b one block away to its right, and non-PD block 214b has PD block 212a one block away to its left). As another example, in the pixel block 210 array shown in FIG. 2, a uPDP location in non-PD block 214c can be upsampled using pPDPs from PD block 212a and PD block 212c. For example, in the pixel block 210 array shown in FIG. 2, a uPDP location in non-PD block 214d can be upsampled using pPDPs from PD blocks 212a, 212b, and 212c. As illustrated in FIG. 4, each uPDP 420 location is some distance measurement 440 away from its neighboring pPDP 220 locations. For example, the upsampled location of uPDP 420a is a distance of 440aa away from the physical location of pPDP 220a and a distance of 440ba away from the physical location of pPDP 220b; and the upsampled location of uPDP 420b is a distance of 440ab away from the physical location of pPDP 220a and a distance of 440bb away from the physical location of pPDP 220b.

Some embodiments of the weights generator 345 use the local contrast values from the contrast map 322 and the distance measurements (e.g., distance measurements 440 in FIG. 4) to compute and output a set of upsampling weights 347. Some implementations include additional values in the computation of the upsampling weights 347, such as a normalization factor. One or more upsampling weights 347 can be computed for pairing of a uPDP location with a respective neighboring pPDP location 212. For example, for implementations using two nearest neighbors for each uPDP location, each uPDP location will be associated with two upsampling weights 347. For example, the upsampling weight 347 for each uPDP-pPDP location pair can be computed by multiplying (or otherwise combining) a first weighting factor based on a respective local contrast value at the pPDP location, a second weighting factor based on a respective distance between the uPDP location and the pPDP location, and a normalization factor.

The upsampling filter 350 can use the upsampling weights 347 and the local disparity values from the physical PD disparity map 317 to compute upsampled disparity values 352, including an upsampled disparity value 352 for each uPDP location. The computing of the upsampled disparity value 352 by the upsampling filter 350 can be performed using any suitable upsampling filter algorithm, such as a joint bilateral filter. For example, the upsampled disparity value 352 for a particular uPDP location is computed according to a weighted sum of a local disparity value for a first neighboring pPDP location weighted by an upsampling weight 347 computed for the first neighboring pPDP location; a local disparity value for a second neighboring pPDP location weighted by an upsampling weight 347 computed for the second neighboring pPDP location; etc.

Some embodiments can pass the upsampled disparity values 352 directly to the output subsystem 380 (e.g., for use in performing PDAF). For example, some application contexts expect the output of the CIS system 130 to be a set of disparity values. In some such embodiments, the upsampled disparity values 352 and the local disparity values from the physical PD disparity map 317 can be combined to generate an upsampled PD disparity map 375. For example, the upsampled PD disparity map 375 is an array that includes a disparity value for each pPDP location and for each uPDP location. The physical PD disparity map 317 is a relatively low-resolution physical PD disparity map indicating the disparity values only for the pPDP locations. For example, the original image data 305 can have a full resolution of 48 Megapixels (based on the number of photodetectors in the imaging sensor array 140), and the full output of the pPDPs 220 may have a resolution of 1500-by-332 pixels (i.e., 498,000 pixels, based on approximately one percent of the photodetectors being used to form the pPDPs 220). In some implementations, the physical PD disparity map 317 can assign a disparity value to each of those photodetectors, such that the physical PD disparity map 317 has the same 1500-by-332 resolution. In other implementations, the physical PD disparity map 317 can assigning a single disparity value to each pPDP 220 (e.g., each group of four photodetectors, such as two first-viewpoint elements and two second-viewpoint elements), such that the resolution of the physical PD disparity map 317 is reduced to 750-by-166 (i.e., 124,500 disparity values associated with 124,500 pPDP locations, or approximately one quarter of one percent of the full imaging sensor array 140 resolution). The upsampled PD disparity map 375 can include both the original physical PD disparity map 317 information and the upsampled disparity values 352. Thus, the resolution of the upsampled PD disparity map 375 is higher than that of the physical PD disparity map 317 by a factor corresponding to the amount of upsampling. For example, the resolution of the physical PD disparity map 317 is 750-by-166, and the resolution of the upsampled PD disparity map 375 is 750-by-496 (increased by a factor of slightly less than three). Other resolutions can be obtained with different image sensor sizes, different numbers and/or arrangements of pixel blocks 210, different numbers and/or arrangements of pPDPs 220 in the pixel blocks 210, different amounts of upsampling, etc. For example, embodiments can generally use a low-resolution physical PD disparity map 317 (e.g., less than five percent of the full image sensor resolution) and can output the upsampled PD disparity map 375 to be at least twice the resolution of the physical PD disparity map 317.

Other embodiments of the PDAF resolution upsampling system 300 can convert the upsampled disparity values 352 to upsampled pixel image values at the uPDP locations using the disparity-to-pixel converter 360. The upsampled pixel image values can be computed to simulate the different-viewpoint pixel image values that would be obtained at each uPDP location if there were a pPDP at that location. Embodiments of the disparity-to-pixel converter 360 include a local reference generator 365 and a uPDP image value generator 370. The local reference generator 365 can generate, for each uPDP location, one or more reference (i.e., first-viewpoint) pixel image values 367 for the uPDP location based on one or more pixel image values obtained by one or more photodetectors in locations corresponding to the uPDP location (e.g., according to the original image data 305). For example, the uPDP location can be used to identify a particular 2-by-2 block of photodetectors that is correspondingly located in a non-PD block 214, and the pixel image values for one or more of those 2-by-2 photodetectors (e.g., obtained from the original image data 305) is used to form one or more reference pixel image values 367 (e.g., or a reference image) for that uPDP location as if received by first-viewpoint elements of a pPDP 220.

The uPDP image value generator 370 can then compute one or more second-viewpoint uPDP values for each uPDP location based on the reference pixel image value(s) 367 and the upsampled disparity value 352 for that uPDP location. As described herein, the upsampled disparity value 352 indicates the amount of disparity (i.e., spatial shift) that would have been manifest between the different-viewpoint pixel image values had a pPDP 220 been in the same location. As such, the upsampled disparity value 352 for a uPDP location can be used to indicate an amount and direction of spatial shift to apply to the reference pixel image value(s) 367 to obtain the second-viewpoint uPDP value(s). The reference pixel image value(s) 367 and the second-viewpoint uPDP value(s) at each uPDP location together form upsampled pixel image values for the uPDP location, as they effectively simulate what would have been the multiple-viewpoint outputs of a pPDP 220, if a pPDP 220 had been physically located at the uPDP location.

Embodiments of the disparity-to-pixel converter 360 can output the upsampled pixel image values to the output subsystem 380. In some embodiments, the output from the disparity-to-pixel converter 360 is combined with pPDP 220 pixel image output data (e.g., obtained from the original image data 305) to generate an upsampled PD pixel map 372. For example, the upsampled PD pixel map 372 includes: for each uPDP location, the respective first-viewpoint uPDP image value(s) generated for the uPDP location, and the respective second-viewpoint uPDP image value(s) computed for the uPDP location; and for each pPDP location, respective first-viewpoint pPDP image value(s) and respective second-viewpoint pPDP image values corresponding to pixel image values obtained by the pPDP 220 associated with the pPDP location as part of capturing the original image data 305. The upsampled PD pixel map 372 can be output to the output subsystem 380, such as to support PDAF. For example, some application contexts expect to see pixel image values as outputs from the CIS system 130.

Some embodiments of the disparity-to-pixel converter 360 include additional features. For example, a pre-processing module can be included to prepare data prior to the conversion. In some implementations, the disparity-to-pixel converter 360 includes an adaptive selection module (e.g., as part of the uPDP image value generator 370). The adaptive selection module can adaptively select output pixel data based on local disparity quality decisions, such as the contrast and confidence decisions described above with reference to the pixel-to-disparity converter 310. For example, upsampled pixel image values are used in the upsampled PD pixel map 372 only if local contrast and/or confidence flags indicate that good quality disparity data was used to compute those upsampled pixel image values. If a particular upsampled pixel image value in a particular uPDP location is not used, some implementations can approximate the value using a different technique, such as linear interpolation based on pixel image values from neighboring pPDPs 220.

Figure 5:
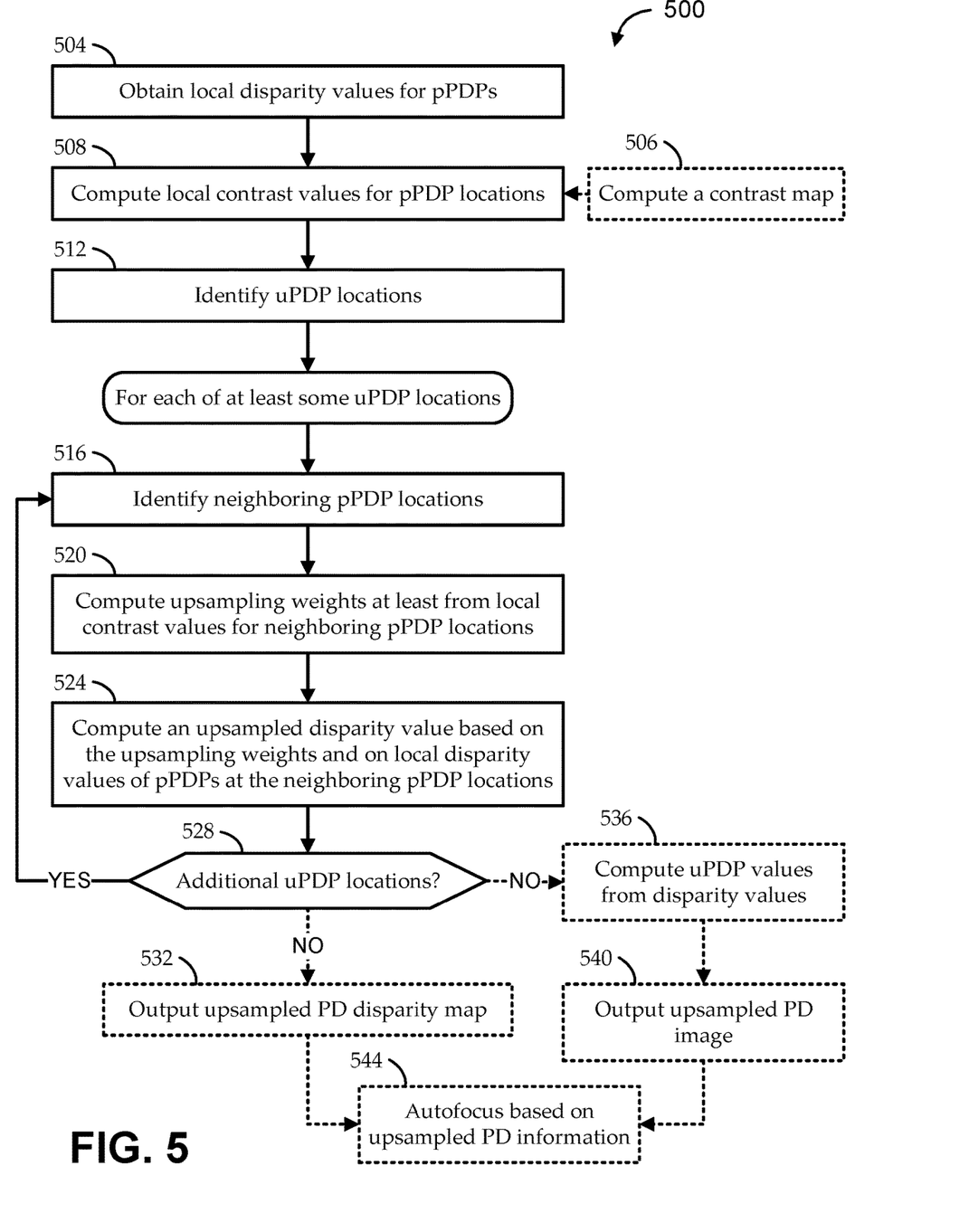
FIG. 5 shows a flow diagram of an illustrative method for real-time upsampling in a PDAF system, according to various embodiments described herein.

FIG. 5 shows a flow diagram of an illustrative method 500 for real-time upsampling in a phase-detection autofocus (PDAF) system, according to various embodiments described herein. Embodiments of the method 500 can be performed using any suitable system, including the systems described herein. Embodiments of the method 500 begin at stage 504 by obtaining a phase-detection (PD) disparity map indicating a local disparity value for each of multiple physical PD pixels (pPDPs) of an image sensor. Each local disparity value is computed from original image data obtained by the image sensor. As described herein, the image sensor includes an array of pixel blocks, each being a respective photodetector array. A subset of the pixel blocks is configured as PD blocks by, for each of the subset of the pixel blocks, configuring a portion of the respective photodetector array to form at least one of the pPDPs, such that each of the plurality of pPDPs is associated with a particular pPDP location in a particular one of the PD blocks.

At stage 508, embodiments can compute a local contrast value for each of the pPDP locations based on spatial contrast information generated from the original image data. In some embodiments, at stage 506, a contrast map is computed from the original image data indicating the spatial contrast information. As described herein, the contrast map has a higher resolution than the PD disparity map, and may have the same or lower resolution than that of the original image data.

At stage 512, embodiments can identify upsampled PD pixel (uPDP) locations (also referred to as upsampled locations herein), each as a location within the respective photodetector array of a respective one of the pixel blocks other than the PD blocks (i.e., non-PD blocks). In some implementations, the uPDP location is at a same relative position within its non-PD block as neighboring pPDP locations are within their respective PD blocks. The number of uPDP locations determines the amount of upsampling. For example, in a pixel block 210 array like the one shown in FIG. 2, each group of six pixel blocks 210 includes a single PD block 212 and five non-PD blocks 214, and each PD block 212 uses one-sixteenth of its 256 photodetectors to form four pPDPs. This can be considered as a PDAF resolution of approximately one percent (i.e., 16/256*1/6≈0.01). If a single uPDP location in a non-PD block 214 is identified for each pPDP in each PD block 212, the PDAF resolution can effectively double (e.g., from approximately 1 percent to approximately 2 percent). If the pPDPs in the PD blocks 212 are used to identify the same density of uPDP locations in all of the non-PD blocks 214, the resolution can effectively be increased by up to six times (depending on the total number and configuration of pixel blocks 210, there may not be five non-PD blocks 214 for every PD block 212; such that the resolution may increase by less than six times in such a case).

For each uPDP location (of some or all of the uPDP locations), the method 500 can iteratively perform stages 516-528 to generate upsampled disparity values at those uPDP locations. For example, after each iteration of stages 516-524, a determination is made at stage 528 as to whether additional uPDP locations remain to be processed. The method 500 can continue to iterate until the determination at stage 528 indicates that there are no more uPDP locations for which to generate upsampled disparity values. In some embodiments, the method 500 iterates for all uPDP locations. In other embodiments, techniques can be used to determine whether certain uPDP locations are not good candidates for upsampling, such as by determining that certain pPDP data and/or contrast data does not seem well-suited for performing upsampling with high confidence in a particular area, etc. In such cases, the method 500 may determine not to generate upsampled disparity values at those uPDP locations determined not to be good upsampling candidates.

At stage 516, embodiments can identify neighboring pPDP locations as proximate to the uPDP location. In some implementations, stage 516 identifies the two nearest neighbors (first and second pPDP locations) to the uPDP location. In other implementations, stage 516 identifies a geometrically consistent set of two or more neighbors that may or may not be the nearest neighbors. For example, in the pixel block 210 array shown in FIG. 4, each non-PD block 214 has a first PD block 212 directly adjacent (e.g., non-PD block 214a has PD block 212a immediately to its left, and non-PD block 214b has PD block 212b immediately to its right), and a second PD block 212 one block away in the opposite direction (e.g., non-PD block 214a has PD block 212b one block away to its right, and non-PD block 214b has PD block 212a one block away to its left). As another example, in the pixel block 210 array shown in FIG. 2, a uPDP location in non-PD block 214c can be upsampled using pPDPs from PD block 212a and PD block 212c. In other implementations, stage 516 identifies any other suitable geometrically consistent set of two or more neighbors that may or may not be the nearest neighbors. For example, in the pixel block 210 array shown in FIG. 2, a uPDP location in non-PD block 214d can be upsampled using pPDPs from PD blocks 212a, 212b, and 212c.

At stage 520, embodiments can compute a set of upsampling weights based at least on the local contrast value for each of the nearest neighbor pPDP locations (i.e., at least the first pPDP location and the second pPDP location). In some implementations, for each uPDP location, the computing of upsampling weights at stage 520 is based further on distances between the uPDP location and each of the nearest neighbor pPDP locations. For example, for each pPDP location, the contrast value, the distance measurement to the uPDP location, and a normalization factor are used to compute an upsampling weight.

At stage 524, embodiments can compute an upsampled disparity value for the uPDP location based on the set of upsampling weights and on the local disparity values indicated by the PD disparity map for those of the plurality of pPDPs associated with the nearest neighbor pPDP locations. The computing of the upsampled disparity value at stage 524 can be performed using any suitable upsampling filter algorithm, such as a joint bilateral filter. For example, the local disparity value for the first neighboring pPDP location is weighted by the upsampling weight computed for the first neighboring pPDP location, the local disparity value for the second neighboring pPDP location is weighted by the upsampling weight computed for the second neighboring pPDP location, etc. to determine the upsampled disparity value for the uPDP location.

Having completed computing of upsampled disparity values for the uPDP locations (the determination at stage 528 is that there are no more uPDP locations for which to generate upsampled disparity values), some embodiments can perform one or more additional stages. At stage 532, some embodiments can generate and output an upsampled PD disparity map. The PD disparity map used in stage 504 is a relatively low-resolution physical PD disparity map indicating the disparity values for the pPDP locations. For example, the original image data can have an original resolution of 48 Megapixels (based on the image sensor resolution), and the full output of the pPDPs may have a resolution of 1500-by-332 pixels (i.e., 498,000 pixels, based on approximately one percent of the photodetectors being used to form the pPDPs). In some implementations, the physical PD disparity map can assign a disparity value to each of those pixels, such that the physical PD disparity map has the same 1500-by-332 resolution. In other implementations, the physical PD disparity map can assigning a single disparity value to each pPDP (e.g., each group of four photodetectors, such as two first-viewpoint elements and two second-viewpoint elements), such that the resolution of the physical PD disparity map is reduced to 750-by-166 (i.e., 124,500 disparity values associated with 124,500 pPDP locations, or approximately one quarter of one percent of the image sensor resolution). The upsampled PD disparity map generated and output at stage 532 can include both the original physical PD disparity map information (i.e., the disparity values for the pPDP locations, such as the disparity values for 124,500 pPDP locations) and the upsampled disparity values at each uPDP location. Thus, the resolution of the upsampled PD disparity map is higher than that of the physical PD disparity map by a factor corresponding to the amount of upsampling. For example, the resolution of the physical PD disparity map is 750-by-166, and the resolution of the upsampled PD disparity map is 750-by-496 (increased by a factor of slightly less than three). Other resolutions can be obtained with different image sensor sizes, different numbers and/or arrangements of pixel blocks 210, different numbers and/or arrangements of pPDPs in the pixel blocks 210, different amounts of upsampling, etc. For example, embodiments can generally use a low-resolution physical PD disparity map (e.g., less than five percent of the full image sensor resolution) and can output the upsampled PD disparity map to be at least twice the resolution of the physical PD disparity map.

Some embodiments convert from the upsampled disparity values to upsampled pixel image values at the uPDP locations at stage 536. The upsampled pixel image values can be computed to simulate the different-viewpoint pixel image values that would be obtained at each uPDP location if there were a pPDP at that location. In some embodiments, for each uPDP location, one or more first-viewpoint uPDP values is generated for the uPDP location based on one or more pixel image values obtained by one or more photodetectors in locations corresponding to the uPDP location. For example, the uPDP location can be used to identify a particular 2-by-2 block of photodetectors that is correspondingly located in a non-PD block, and the pixel image values for one or more of those 2-by-2 photodetectors (e.g., obtained from the original image data) is used to form a pixel image value (e.g., or a reference image) for that uPDP location as if from a first viewpoint. One or more second-viewpoint uPDP values can then be computed for each uPDP location based on the first-viewpoint uPDP value(s) and the upsampled disparity value for that uPDP location. As described herein, the upsampled disparity value indicates the amount of disparity that would have been manifest between the different-viewpoint pixel image values had a pPDP been in the same location. As such, the upsampled disparity value for a uPDP location can be used to indicate an amount and direction of spatial shift to apply to the first-viewpoint uPDP value(s) to obtain the second-viewpoint uPDP value(s).

Some embodiments can output the upsampled PD pixel map at stage 540. In some implementations, the upsampled PD pixel map includes, for each uPDP location, the respective first-viewpoint uPDP value(s) generated for the uPDP location, and the respective second-viewpoint uPDP value(s) computed for the uPDP location. In some implementations, the upsampled PD pixel map also includes, for each pPDP location, one or more respective first-viewpoint pPDP values and one or more respective second-viewpoint pPDP values corresponding to pixel image values obtained by the pPDP associated with the pPDP location as part of capturing the original image data.

In some embodiments, at stage 544, one or more outputs can be used to perform PDAF. In some implementations, the upsampled PD disparity map generated and output at stage 532 is used to perform PDAF at stage 544. In some implementations, additionally or alternatively, the upsampled PD pixel map generated and output at stage 540 is used to perform PDAF at stage 544.

While this disclosure contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A recitation of "a", "an" or "the" is intended to mean "one or more" unless specifically indicated to the contrary. Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned here are incorporated by reference in their entirety for all purposes. None is admitted to be prior art.

What is claimed is:

1. A method for real-time upsampling in a phase-detection autofocus (PDAF) system, the method comprising:
obtaining a phase-detection (PD) disparity map indicating a local disparity value for each of a plurality of physical PD pixels (pPDPs) of an image sensor, each local disparity value computed from original image data obtained by the image sensor, the image sensor comprising an array of pixel blocks, each pixel block being a respective photodetector array,
wherein a subset of the pixel blocks is configured as PD blocks by, for each of the subset of the pixel blocks, configuring a portion of the respective photodetector array to form at least one of the plurality of pPDPs, such that each of the plurality of pPDPs is associated with one of a plurality of pPDP locations in the PD blocks;

obtaining a local contrast value for each of the plurality of pPDP locations based on spatial contrast information generated from the original image data;

identifying a plurality of upsampled PD pixel (uPDP) locations, each as a location within the respective photodetector array of a respective one of the pixel blocks other than the PD blocks; and for each uPDP location of at least some of the plurality of uPDP locations:

identifying at least first and second of the plurality of pPDP locations as proximate to the uPDP location;

computing a set of upsampling weights based at least on the local contrast value for each of at least the first pPDP location and the second pPDP location; and computing an upsampled disparity value for the uPDP location based on the set of upsampling weights and on the local disparity values indicated by the PD disparity map for those of the plurality of pPDPs associated with at least the first pPDP location and the second pPDP location.

2. The method of claim 1, wherein the obtaining the local contrast value comprises computing a contrast map from the original image data indicating the spatial contrast information, the contrast map having higher resolution than the PD disparity map.

3. The method of claim 2, wherein the contrast map has a lower resolution than the original image data.

4. The method of claim 1, wherein, for each uPDP location, the computing the set of upsampling weights is based further on distances between the uPDP location and each of the at least first and second pPDP locations.

5. The method of claim 1, wherein the PD disparity map is a physical PD disparity map, and further comprising:

outputting an upsampled PD disparity map indicating the local disparity values at each pPDP location and indicating the upsampled disparity values at each uPDP location, wherein the original image data has a first image resolution, the physical PD disparity map has a second image resolution that is less than five percent of the first image resolution, and the upsampled PD disparity map has a third image resolution that is at least two times the second imaging resolution.

6. The method of claim 1, further comprising:

for each of the uPDP locations, generating a respective first-viewpoint uPDP value based on one or more pixel image values from the original image data obtained by one or more photodetectors corresponding to the uPDP location in the image sensor;

computing a second-viewpoint uPDP value for each of the uPDP locations based on the respective first-viewpoint uPDP value at the uPDP location and the upsampled disparity value for the uPDP location.

7. The method of claim 6, further comprising:

outputting an upsampled PD pixel map to indicate:

for each pPDP location, a respective first-viewpoint pPDP value and a respective second-viewpoint pPDP value corresponding to pixel image values obtained by the pPDP associated with the pPDP location as part of capturing the original image data; and for each uPDP location, the respective first-viewpoint uPDP value generated for the uPDP location, and the respective second-viewpoint uPDP value computed for the uPDP location.

8. The method of claim 1, wherein obtaining the PD disparity map comprises:

receiving the original image data from the image sensor as pixel image values for the respective photodetector arrays of the plurality of pixel blocks; and computing the local disparity values for each of the plurality of pPDPs based on detecting local image phase shifts local to the pPDP locations obtained by pattern matching across multiple image phases generated from the pixel image values.

9. The method of claim 1, wherein:

the respective photodiode array of each pixel block is arranged according to a color filter array (CFA) pattern that includes white pixels; and the computing the local contrast value is based on a contrast image generated by high-pass-filtering a portion of the original image data obtained by the white pixels.

10. The method of claim 1, wherein each of the subset of pixel blocks comprises at least one optical component, each in optical communication with a respective subarray of photodetectors of the respective photodetector array, such that the optical component causes first elements of the respective subarray to detect a respective portion of the original image data from a first viewpoint, and concurrently causes second elements of the respective subarray to detect the respective portion of the original image data from a second viewpoint, the second viewpoint being complementary to the first viewpoint, thereby configuring the portion of the respective photodetector array to form the at least one of the plurality of pPDPs.

11. A phase-detection autofocus (PDAF) resolution upsampling system comprising:

a disparity map interface to couple with a pixel-to-disparity converter to obtain a phase-detection (PD) disparity map indicating a local disparity value for each of a plurality of physical PD pixels (pPDPs) of an image sensor, each local disparity value computed from original image data obtained by the image sensor, the image sensor comprising an array of pixel blocks, each pixel block being a respective photodetector array, wherein a subset of the pixel blocks is configured as PD blocks by, for each of the subset of the pixel blocks, configuring a portion of the respective photodetector array to form at least one of the plurality of pPDPs, such that each of the plurality of pPDPs is associated with one of a plurality of pPDP locations in the PD blocks;

a contrast map interface to couple with a contrast mapper to obtain a local contrast value for each of the plurality of pPDP locations based on spatial contrast information generated from the original image data; and a disparity upsampler coupled with the disparity map interface and the contrast map interface, and comprising:

a weights generator to compute, for each upsampled PD pixel (uPDP) location of a plurality of uPDP locations that each correspond to a physical location within the respective photodetector array of a respective one of the non-PD blocks, a set of upsampling weights based at least on the local contrast value for each of at least a first pPDP location and a second pPDP location determined to be proximate to the uPDP location; and an upsampling filter to compute, for each uPDP location, an upsampled disparity value for the uPDP location based on the set of upsampling weights computed for the uPDP location and based on the local disparity values indicated by the PD disparity map for those of the plurality of pPDPs associated with at least the first pPDP location and the second pPDP location.

12. The PDAF resolution upsampling system of claim 11, further comprising:

the pixel-to-disparity converter configured to receive the original image data from the image sensor as pixel image values for the respective photodetector arrays of the plurality of pixel blocks, and to compute the local disparity values for each of the plurality of pPDPs based on detecting local image phase shifts local to the pPDP locations obtained by pattern matching across multiple image phases generated from the pixel image values.

13. The PDAF resolution upsampling system of claim 11, further comprising:

the contrast mapper configured to compute the local contrast values by computing a contrast map from the original image data indicating the spatial contrast information, such that the contrast map has a higher resolution than the PD disparity map.

14. The PDAF resolution upsampling system of claim 11, wherein the weights generator is to compute the set of upsampling weights for each uPDP location based further on obtaining distances between the uPDP location and each of at least the first pPDP location and the second pPDP location.

15. The PDAF resolution upsampling system of claim 11, wherein the PD disparity map is a physical PD disparity map, and the disparity upsampler is configured further to:

output an upsampled PD disparity map indicating the local disparity values at each pPDP location and indicating the upsampled disparity values at each uPDP location, wherein the original image data has a first image resolution, the physical PD disparity map has a second image resolution that is less than five percent of the first image resolution, and the upsampled PDP disparity map has a third image resolution that is at least two times the second imaging resolution.

16. The PDAF resolution upsampling system of claim 11, further comprising:

a disparity-to-pixel converter configured, for each of the uPDP locations, to:

generate a respective first-viewpoint uPDP value based on one or more pixel image values from the original image data obtained by one or more photodetectors corresponding to the uPDP location in the image sensor; and compute a second-viewpoint uPDP value for each of the uPDP locations based on the respective first-viewpoint uPDP value at the uPDP location and the upsampled disparity value for the uPDP location.

17. The PDAF resolution upsampling system of claim 16, wherein the disparity-to-pixel converter is further configured to:

output an upsampled PD pixel map to indicate:

for each pPDP location, a respective first-viewpoint pPDP value and a respective second-viewpoint pPDP value corresponding to pixel image values obtained by the pPDP associated with the pPDP location as part of capturing the original image data; and for each uPDP location, the respective first-viewpoint uPDP value generated for the uPDP location, and the respective second-viewpoint uPDP value computed for the uPDP location.

18. The PDAF resolution upsampling system of claim 11, wherein each PD block comprises at least one optical component, each in optical communication with a respective subarray of photodetectors of the respective photodetector array, such that the optical component causes first elements of the respective subarray to detect a respective portion of the original image data from a first viewpoint, and concurrently causes second elements of the respective subarray to detect the respective portion of the original image data from a second viewpoint, the second viewpoint being complementary to the first viewpoint, thereby configuring the portion of the respective photodetector array to form the at least one of the plurality of pPDPs.

19. A system for real-time upsampling in a phase-detection autofocus (PDAF) system, the system comprising:

one or more processors; and a non-transient, processor-readable memory having instructions stored thereon which, when executed, cause the one or more processors to perform steps comprising:

obtaining a phase-detection (PD) disparity map indicating a local disparity value for each of a plurality of physical PD pixels (pPDPs) of an image sensor, each local disparity value computed from original image data obtained by the image sensor, the image sensor comprising an array of pixel blocks, each pixel block being a respective photodetector array, wherein a subset of the pixel blocks is configured as PD blocks by, for each of the subset of the pixel blocks, configuring a portion of the respective photodetector array to form at least one of the plurality of pPDPs, such that each of the plurality of pPDPs is associated with one of a plurality of pPDP locations in the PD blocks;

computing a local contrast value for each of the plurality of pPDP locations based on spatial contrast information generated from the original image data;

identifying a plurality of upsampled PD pixel (uPDP) locations, each as a location within the respective photodetector array of a respective one of the pixel blocks other than the PD blocks; and for each uPDP location of at least some of the plurality of uPDP locations:

identifying at least first and second of the plurality of pPDP locations as proximate to the uPDP location;

computing a set of upsampling weights based at least on the local contrast value for each of at least the first pPDP location and the second pPDP location; and computing an upsampled disparity value for the uPDP location based on the set of upsampling weights and on the local disparity values indicated by the PD disparity map for those of the plurality of pPDPs associated with at least the first pPDP location and the second pPDP location.

20. The system of claim 19, wherein the PD disparity map is a physical PD disparity map, and the steps further comprise:
- outputting an upsampled PD disparity map indicating the local disparity values at each pPDP location and indicating the upsampled disparity values at each uPDP location,
- wherein the original image data has a first image resolution,
- the physical PD disparity map has a second image resolution that is less than five percent of the first image resolution, and
- the upsampled PD disparity map has a third image resolution that is at least two times the second imaging resolution.

* * * * *